(12) United States Patent
Sakai

(10) Patent No.: US 8,370,059 B2
(45) Date of Patent: Feb. 5, 2013

(54) NAVIGATION APPARATUS AND NAVIGATION PROGRAM

(75) Inventor: Takamitsu Sakai, Okazaki (JP)

(73) Assignee: Aisin AW Co., Ltd., Anjo-shi, Aichi (JP)

( * ) Notice: Subject to any disclaimer, the term of this patent is extended or adjusted under 35 U.S.C. 154(b) by 823 days.

(21) Appl. No.: 12/219,956

(22) Filed: Jul. 31, 2008

(65) Prior Publication Data
US 2009/0043493 A1 Feb. 12, 2009

(30) Foreign Application Priority Data

Aug. 10, 2007 (JP) .................. 2007-210389

(51) Int. Cl.
G06F 19/00 (2006.01)
G09F 9/00 (2006.01)
(52) U.S. Cl. .... 701/428; 345/625; 345/637; 348/333.05
(58) Field of Classification Search .................. 701/211, 701/209, 400, 428; 340/995.2, 438, 461; 345/349, 970, 620, 623, 629, 638, 637, 619, 345/625; 348/333.01, 333.05
See application file for complete search history.

(56) References Cited

U.S. PATENT DOCUMENTS

| | | | | |
|---|---|---|---|---|
| 5,757,268 A * | 5/1998 | Toffolo et al. | ................. | 340/461 |
| 5,848,373 A * | 12/1998 | DeLorme et al. | ............ | 701/200 |
| 6,202,026 B1 | 3/2001 | Nimura et al. | ................. | 701/211 |
| 6,339,745 B1 * | 1/2002 | Novik | ............................ | 701/208 |
| 6,487,493 B2 * | 11/2002 | Uekawa et al. | ............... | 701/520 |
| 6,539,289 B2 | 3/2003 | Ogino et al. | ....................... | 701/1 |
| 7,557,800 B2 * | 7/2009 | Yanagisawa | ................... | 345/173 |
| 7,880,602 B2 * | 2/2011 | Kasamatsu | ................... | 340/461 |
| 2005/0179532 A1 * | 8/2005 | Nagai et al. | .................... | 340/461 |
| 2005/0203892 A1 * | 9/2005 | Wesley et al. | ...................... | 707/3 |
| 2005/0273256 A1 * | 12/2005 | Takahashi | ..................... | 701/211 |

FOREIGN PATENT DOCUMENTS

| | | |
|---|---|---|
| JP | 09-113289 | 5/1997 |
| JP | 11-258983 | 9/1999 |
| JP | 2002-372432 | 12/2002 |
| JP | 2006-030615 | 2/2006 |
| WO | WO2005-080139 | 9/2005 |

* cited by examiner

Primary Examiner — Ronnie Mancho
(74) Attorney, Agent, or Firm — Bacon & Thomas, PLLC

(57) ABSTRACT

A display is divided into two regions, a standard region and an enlarged region with a user positioned is at an angle relative to the display. The standard region is formed on a side nearer the user and the enlarged region is formed on a side farther from the user. When the navigation device displays guidance information, information displayed in the standard region is displayed on a standard scale, while information displayed in the enlarged region is displayed enlarged relative to the standard scale. Since the display on the side farther from the user position is thus enlarged, the user can more easily view that guidance information.

11 Claims, 7 Drawing Sheets

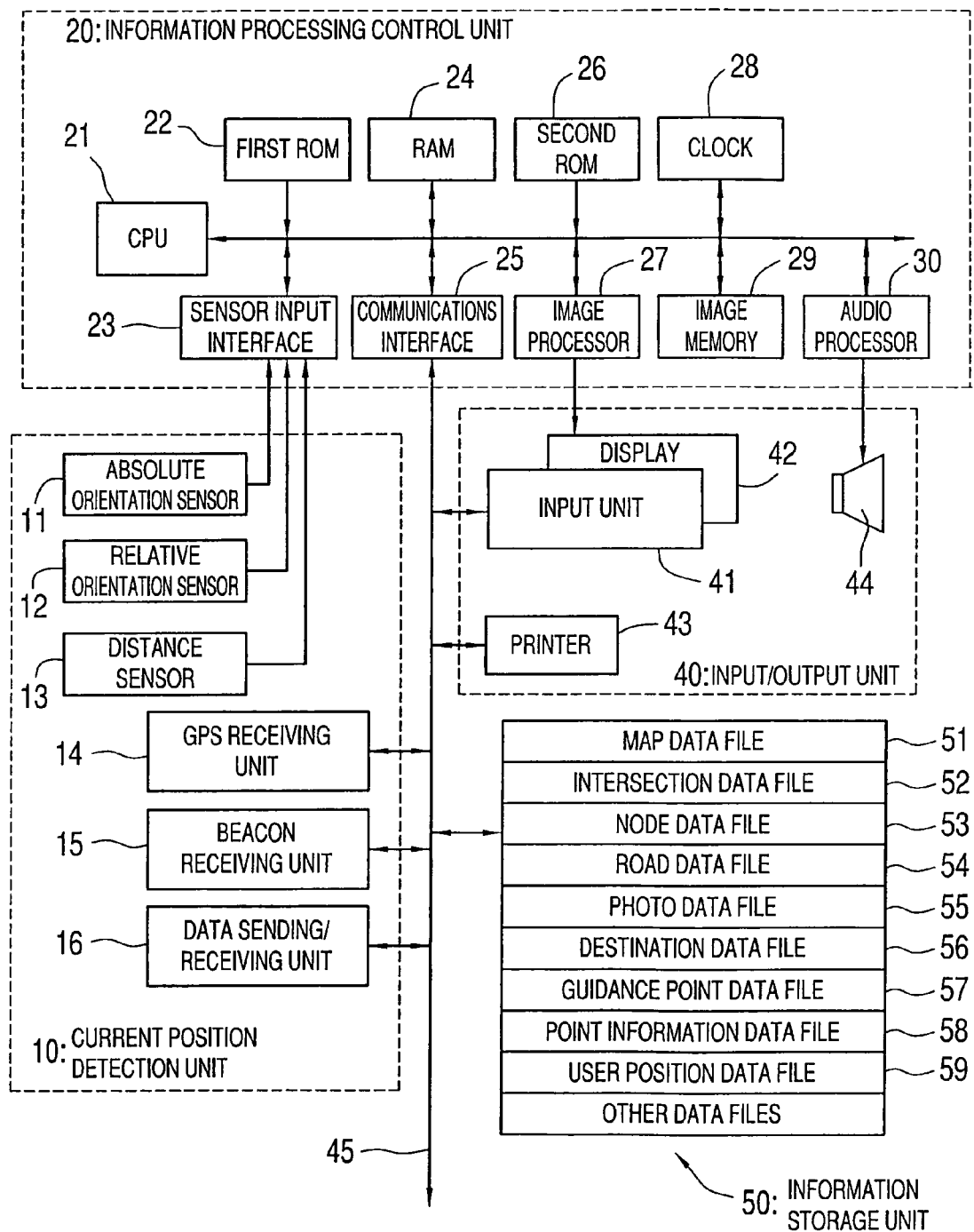

NAVIGATION APPARATUS AND NAVIGATION PROGRAM

INCORPORATION BY REFERENCE

The disclosure of Japanese Patent Application No. 2007-210389 filed on Aug. 10, 2007 including the specification, drawings and abstract is incorporated herein by reference in its entirety.

FIELD OF THE INVENTION

The present invention relates to a navigation apparatus and to a navigation program, which display guidance information on a screen.

DESCRIPTION OF THE RELATED ART

The use of navigation devices (apparatus) for guidance of vehicle travel has grown remarkably in recent years. The functions of a navigation device include: searching for a route from a departure point to a destination, detecting a position of a host vehicle using a global positioning system (GPS) satellite and sensors such as a gyro, and displaying the route to the destination and a current position of the host vehicle on a map.

The navigation apparatus displays guidance information on a display screen. But in order to display more information, a larger display area, such as that provided by a so-called wide screen, is needed. A "wide screen" has a horizontal width that is, for example, approximately 1.5 to 2 times wider than a conventional display screen. The wide screen faces the driver seat and the passenger seat, and is installed in an area positioned between the driver seat and the passenger seat. With the wide screen, more information can be displayed as plural screens of a conventional size in an aligned manner, e.g. a "split screen", or by enlarging the display range. A vehicle navigation device with such a wide screen is disclosed, for example, in Japanese Patent Application Publication No. JP-A-H11-258983.

The wide screen disclosed in JP-A-H11-258983 is rotatably mounted to enable horizontal and vertical setting of the wide screen. Accordingly, the display may be a horizontally elongated map when the wide screen is set horizontal or a vertically elongated map when the wide screen is set vertical.

SUMMARY OF THE INVENTION

One problem with the display described above is that it is often viewed at an angle within the vehicle. For this reason, although the side of the wide screen nearer the user ("nearer side") is easily visible, the display on side of the wide screen farther from the user ("farther side") is difficult to see since it is viewed from a greater distance.

Hence, it is an object of the present invention to facilitate viewing the farther side of a wide screen display unit.

According to a first aspect of the present invention, the display of guidance information on the farther side of a screen relative to a user is more enlarged than guidance information displayed on the nearer side, thereby facilitating viewing of the display on the farther side.

According to a second aspect of the present invention, by obtaining the position of the user, guidance information on the farther side relative to the user can be enlarged and displayed regardless of on which side of a display screen the user is positioned.

According to a third aspect of the present invention, if the guidance information cannot be completely displayed due to enlargement, then items of low priority can be deleted.

According to a fourth aspect of the present invention, if the guidance information cannot be completely displayed due to enlargement, then the degree of magnification of items of low priority can be reduced.

According to a fifth aspect of the present invention, guidance information is displayed so as to fit within the display screen.

According to a sixth aspect of the present invention, any of a plurality of display modes of guidance information can be used and modified as appropriate so as to enable the display of guidance information in an easily viewable manner while reducing display area.

In a seventh aspect, the present invention provides a computer-readable medium encoded with a computer program which configures a computer to operate a display with guidance information on the farther side from a user enlarged relative to that displayed on the side nearer the user.

BRIEF DESCRIPTION OF THE DRAWINGS

FIG. 2A is a block diagram of an embodiment of a navigation apparatus in accordance with the present invention;

DESCRIPTION OF THE PREFERRED EMBODIMENTS (1) Overview of a Preferred Embodiment FIGS. 1A and 1B show a display 42 of a navigation apparatus which is installed in front of and in between a driver seat and a passenger seat so as to face a driver and an occupant sitting in the passenger seat. The display unit 42 has a horizontal width that is approximately 1.5 to 2 times wider than an ordinary display, and is therefore referred to as a "wide screen". Guidance information is displayed on the display unit 42 including maps and roads, as well as indication of orientation, remaining distance to the destination, an estimated arrival time, place names, facility names, facility markers, and the like.

FIG. 1A shows a screen on display unit 42 as equally divided into two regions, a standard region 61 and an enlarged region 62. The user position 60 is at an angle relative to the display unit 42. The standard region 61 is formed on the side nearer the user position 60 ("nearer side") and the enlarged region 62 is formed on the side farther from the user ("farther side").

When the navigation apparatus displays guidance information on the display unit 42, information is displayed in region 61 on a standard scale, while information displayed in the region 62 on an enlarged scale. Since the display on the farther side relative to the user position 60 is thus enlarged, the user can more easily view guidance information on the farther side of the display unit 42.

Figure 1A:
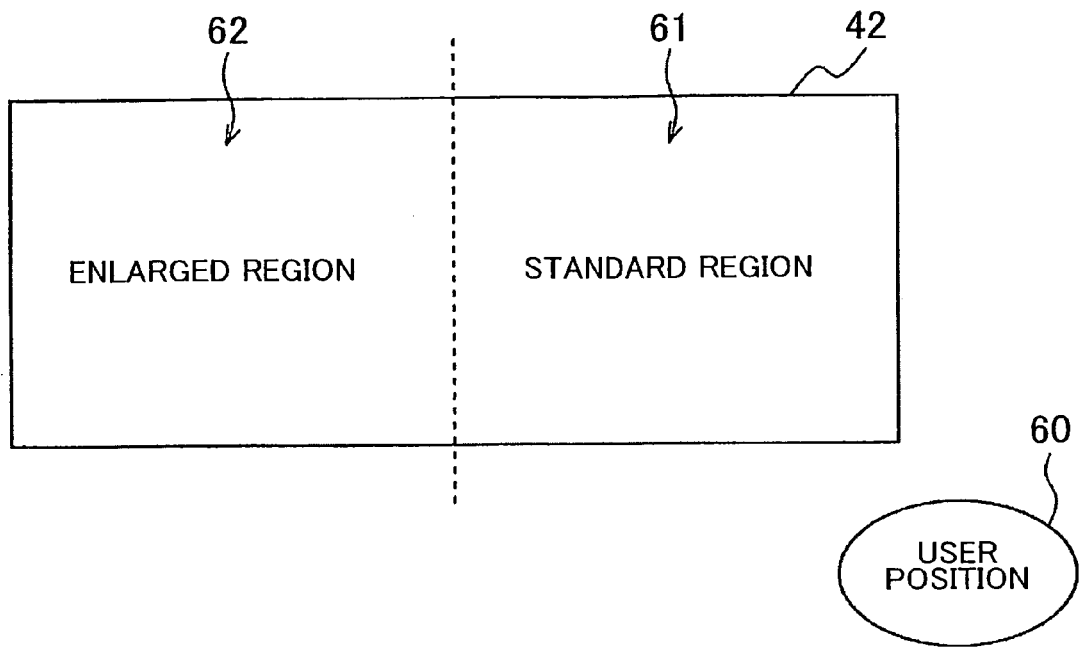
FIGS. 1A and 1B show displays of a navigation apparatus in accordance with the present invention.
Figure 1B:
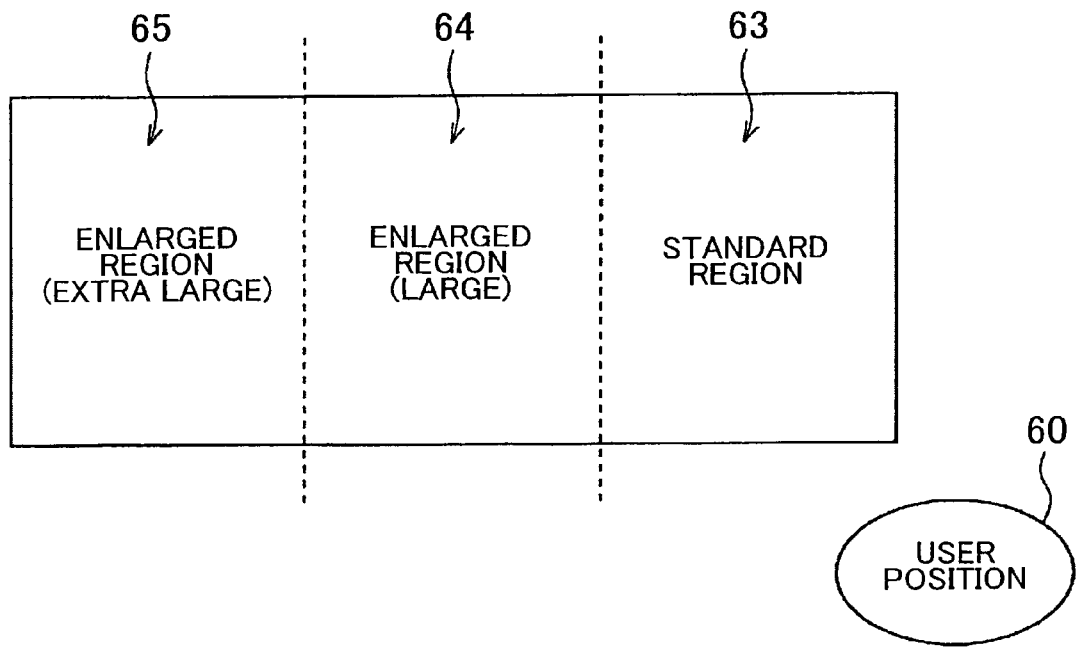

FIG. 1B shows a screen on the display unit 42 divided into three regions. In order of closeness to the user, the regions are a standard region 63, an enlarged region (large) 64, and a farther enlarged region (extra large) 65. In the standard region 63, the navigation apparatus displays guidance information on a standard scale. In the enlarged region (large) 64, the navigation apparatus displays guidance information on a scale greater than that in the standard region 63. And in the enlarged region (extra large) 65, the navigation apparatus displays guidance information on a scale greater than that in the enlarged region (large) 64. In this example as well, since the guidance information is enlarged more as the distance from the user position 60 increases, guidance information on a farther side relative to the user position 60 can be more easily viewed. In addition, various modifications are conceivable, such as farther dividing the screen shown on the display unit 42 or continuously increasing the magnification with distance from the user position 60 (continuous gradient).

As used in this specification, the "nearer side" refers to the area of the display nearest the viewer, while "farther side" refers to areas of the display farther from the user relative to the nearer side. Thus, in the example of FIG. 1B, both of regions 64 and 65 are "farther" from the user than the nearest region 63 ("nearer side"), while region 65 is "farthest" from the viewer relative to region 63.

(2) Details of a Preferred Embodiment

Figure 2B:
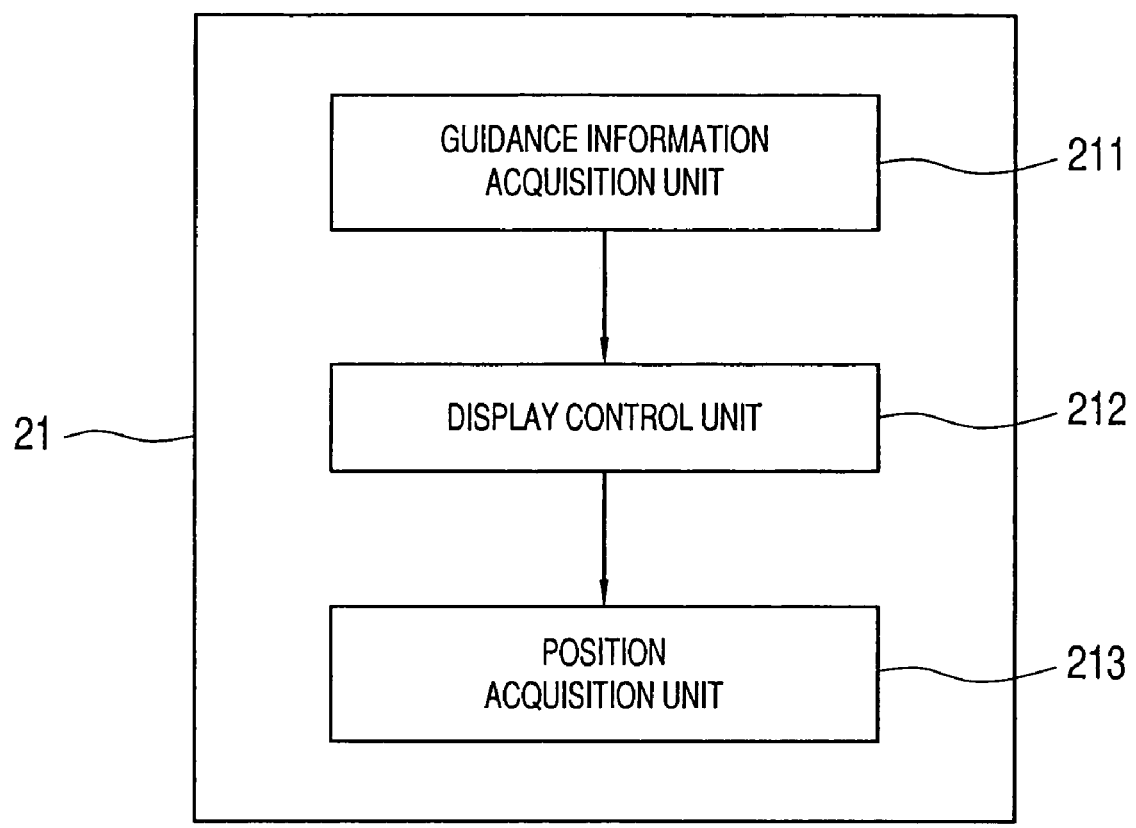
FIG. 2B is a block diagram of the CPU of the navigation apparatus of FIG. 2A.

FIG. 2A is a block diagram of a navigation apparatus 1 to which the present embodiment is applied. The navigation apparatus 1 is mounted in a vehicle, and as shown in the figure, includes a current position detection unit 10, an information processing control unit 20, an input/output unit 40, and an information storage unit 50. The current position detection unit 10 includes an absolute orientation sensor 11 which is a geomagnetic sensor that detects the direction of vehicle travel based on magnetic detection of N. However, the absolute orientation sensor 11 may be any mechanism for detecting an absolute direction.

The relative orientation sensor 12 detects a turn at an intersection, for example, and may be an optical rotation sensor or a potentiometer attached to a rotating portion of a steering mechanism, or an angular sensor mounted adjacent a vehicle wheel. Alternatively, the relative orientation sensor 12 may be a gyro sensor that uses angular velocity to detect angular changes. In other words, the relative orientation sensor 12 may be any device capable of detecting an angle that has changed relative to a reference angle (absolute orientation). A distance sensor 13 may be one that detects and counts rotations of the wheel, or a device that detects acceleration and integrates the detected acceleration twice. In other words, the distance sensor 13 may be any device capable of measuring distance of travel of the vehicle.

A GPS receiving unit 14 is a device that receives signals from an artificial satellite, and is capable of obtaining information such as a signal's time of origin, position of the receiving unit, moving speed of the receiving unit, and travel direction of the receiving unit. A beacon receiving unit 15 is a device that receives a signal sent from a sending unit installed at a stationary point. In particular, the beacon receiving unit 15 is capable of obtaining VICS information and also capable of obtaining information pertaining to vehicle travel, such as traffic congestion, current position, and parking information.

A data sending/receiving unit 16 uses telephone lines and radio frequencies to communicate with units remote from the host vehicle, for exchanging information. For example, unit 16 may be a car telephone, ATIS, VICS, GPS correction system, or inter-vehicle communication system that enables the input and output of information pertaining to travel.

The information processing control unit 20 makes computations and provides control based on information input from the current position detection unit 10 and the input/output unit 40, and information stored in the information storage unit 50. Furthermore, the information processing control unit 20 provides control by output of results of computation to an output unit such as the display unit 42, a printer 43, or a speaker 44.

The information processing control unit 20 includes a central processing unit (CPU) 21 which performs general computation functions and provides overall control of the entire navigation apparatus 1. A first ROM 22 stores programs pertaining to navigation and, in particular, stores a navigation program that searches for point information required for guidance along a route to a destination, outputs the searched point information to a RAM 24 or the like for image display and audio output, and uses a point information data file 58 or the like to search based on a reading of a point name. A sensor input interface 23 receives information from the current position detection unit 10.

The RAM 24 is a storage device that records information input by the user, such as information regarding destinations and pass-through points, and also stores results of computations by the CPU 21, based on the information input by the user, results of route searches, and map information (that also includes the point information) read from the information storage unit 50. A communications interface 25 provides for inputting and outputting information from the current position detection unit 10, especially information obtained from external sources.

A second ROM 26 stores programs pertaining to navigation, and in particular, stores a navigation program for generating audio guidance. An image processor 27 converts vector information processed by the CPU 21 into image information. A clock 28 counts time. An image memory 29 stores the image information processed by the image processor 27. An audio processor 30 processes audio information read from the information storage unit 50 and outputs such information to the speaker 44.

The input/output unit 40 includes an input unit 41 user by the operator (e.g. driver) to input data including a destination, pass-through points, and search conditions from the user; the display unit 42 that displays images, guidance information, and the like; the printer 43 that prints information; and the speaker 44 that outputs audio guidance information. The display unit 42 is a wide screen display, and is installed near the front and center of the driver seat and the passenger seat so as to face the driver seat and the passenger seat, with its horizontal dimension being its longest dimension. The display unit 42 displays visual guidance information.

The input unit 41 is a touch panel, a touch switch, a joystick, or a key switch, for example. The touch panel has a transparent electrode or the like installed on the display 24, and is capable of detecting the point touched on the display unit 42 by the user.

The information storage unit 50 is connected with the information processing control unit 20 via a transmission line 45. Furthermore, the information storage unit 50 stores a map data file 51, an intersection data file 52, a node data file 53, a road data file 54, a photo data file 55, a destination data file 56, a guidance point data file 57, the point information data file 58, a user position data file 59, and other data files. In general, the information storage unit 50 may be a hard drive, a flash memory, or the like, that is a rewritable storage medium, but may also be used in combination with a ROM such as a CD-ROM or a DVD-ROM.

The map data file 51 stores map data such as nation-wide road maps, road maps for arbitrary regions, and residential area maps. The road maps show main highways, expressways, city streets (relatively narrow roads), and landmarks (facilities and the like). The residential maps include city plans that show graphics representing the outlines of buildings and the like, and also show road names and other information.

The intersection data file 52 stores data for geographic position coordinates and names of intersections, and the like. The node data file 53 contains geographic coordinate data and the like for nodes, which are used in route searches. The road data file 54 stores data for roads, such as road locations and types, the number of vehicle lanes, and connections between roads.

The photo data file 55 contains computer graphic image data and image data of photos showing various facilities and sightseeing spots, as well as locations where visual display is required such as main intersections and the like. The destination data file 56 contains data including the locations and names of facilities and other places that are highly likely to become destinations, such as major sightseeing spots and buildings, as well as businesses and offices listed in telephone books. The guidance point data file 57 contains guidance data of points for which guidance is needed, such as guidance regarding branch points and the content of roadside guidance signs.

The point information data file 58 contains point information. Point information is also called point-of-interest (POI) information, and for example, includes information such as the displayed characters of point names, the readings of displayed characters, information corresponding to the displayed characters and readings, as well as information pertaining to coordinates, addresses, telephone numbers, and other items of information for points for which the user may require route guidance. Examples of such points include stadiums, theaters, shops such as restaurants and department stores, schools, government buildings, welfare institutions, head offices and branches of private companies, sightseeing spots, and so on. The point information represents potential search targets.

The user position data file 59 contains user position data. The user position data is information that specifies on which side of the display unit 42 the user is positioned. The navigation apparatus 1 sets the enlarged region in the display unit 42 on the farther side relative to the user position, and sets the standard region on the near side.

The user position data may be input by the user or automatically set. In the case of automatic setting, for example, human body sensors are located at both ends of the display unit 42, which sensors utilize infrared light or the like. When the touch panel on the display unit 42 is touched, the sensors can detect the side from which the hand came in order to determine the user position. Alternatively, the driver side may be set in advance as the standard region and the passenger side as the enlarged region, and neither can be changed.

Next, the guidance information displayed on the display unit 42 will be explained with reference to FIGS. 3A and 3B. The user can select between a standard mode in which the standard region fills the entire display unit 42, and an enlarged mode in which the side nearer the user is designated as the standard region and the side farther from the user is designated as the enlarged region.

Figure 3A:
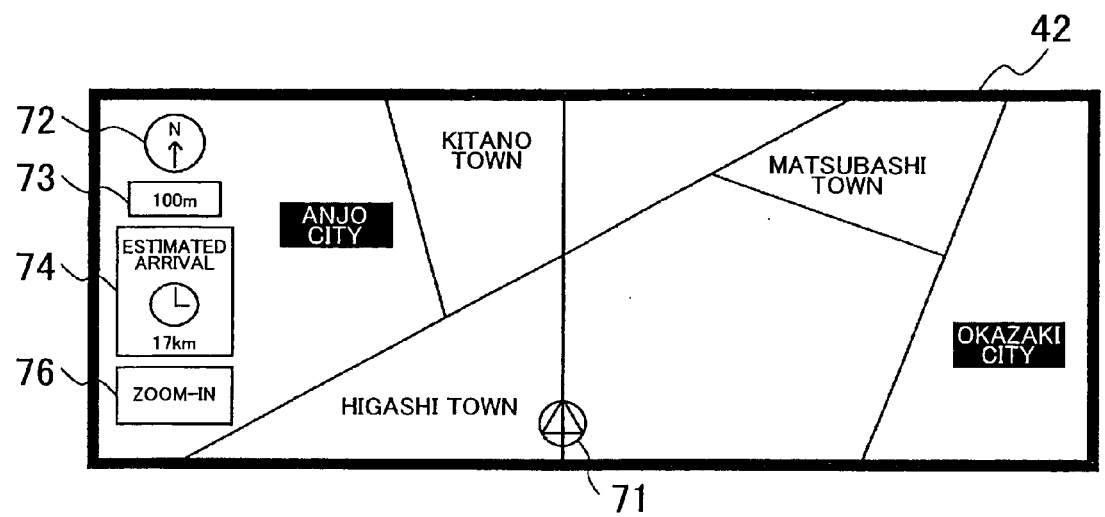
FIGS. 3A and 3B show screens with display of guidance information.

FIG. 3A shows the case where the user has selected the standard mode, and the entirety of the screen on the display unit 42 is displayed on the standard scale. The navigation apparatus 1 uses various data stored in the information storage unit 50 to form an image that is then displayed on the display unit 42.

In the example of FIG. 3A, a map, a host vehicle marker 71, an orientation marker 72, a distance marker 73, an estimated arrival time 74, a zoom-in button 76, and various place names such as "Anjo City" are displayed on the display unit 42. Also, facilities such as restaurants (not shown) can be displayed as facility markers represented by graphics, symbols, or the like.

These display elements are displayed on the display unit 42 by the navigation apparatus 1 using various data stored in the information storage unit 50. The navigation apparatus 1 can control the display position, size, and showing/hiding of the display elements independent of one another. The display elements function as route guidance information.

The host vehicle marker 71 indicates the position of the host vehicle, and is displayed superimposed on a route. The host vehicle marker 71 is a triangle within a circle, and the apex of the triangle represents the direction of travel.

The left side of the screen displays the orientation marker 72, the distance marker 73, the estimated time of arrival marker 74, and the zoom-in button 76. The orientation marker 72 indicates the direction in which the host vehicle is traveling. The distance marker 73 indicates the distance to a point at which the course of travel is to be changed, such as a right turn at an intersection.

The estimated arrival marker 74 indicates the estimated time of arrival at the destination and the distance to the destination. The zoom-in button 76 is a button the user touches in order to switch to the enlarged mode. Various town and city names such as Anjo City, Okazaki City, Kitano Town, Matsubashi Town, and Higashi Town are represented by characters.

A coordinate system is set on the screen of the display unit 42, and positions on the display screen can be specified by coordinate values. The guidance information is displayed within small rectangular regions, and one corner of each rectangular region (e.g. a lower left corner) is designated as a reference point. The navigation apparatus 1 places the reference point of the guidance information on the coordinate system of the display screen, thereby specifying a display position for the guidance information on the display unit 42.

Figure 3B:
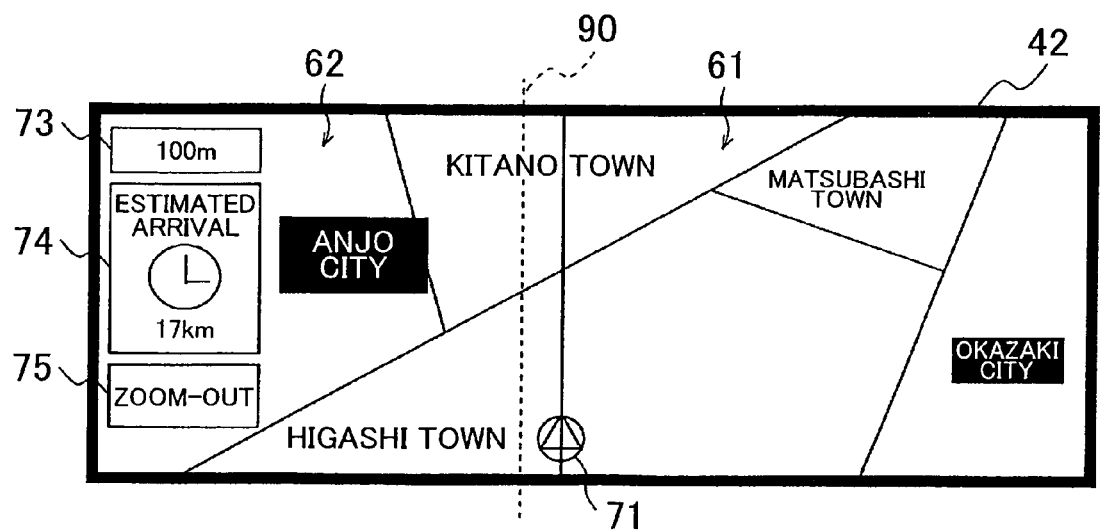

FIG. 3B shows the case where the user has selected the enlarged mode, and the right half of the screen on the display unit 42 is set as the standard (size) region 61 while the left half is set as the enlarged region 62. In the example of the present embodiment, the boundary line between the standard (size) region 61 and the enlarged region 62 (a dotted line 90) is set so that the width of the display unit 42 is divided 45:55, using the side farther from the user as a reference. Note that FIG. 3B is merely an example, and it is also possible to divide the screen 50:50 or 60:40, for example.

The scale of guidance information displayed in the standard region 61, such as the characters "Matsubashi Town" and "Okazaki City" and the host vehicle marker 71, is set to the same standard scale as used in the standard mode. However, the characters "Kitano Town", "Higashi Town" and "Anjo City", as well as the distance marker 73, the estimated arrival marker 74, a zoom-out button 75, and the like in the enlarged region 62 are displayed on an enlarged scale that is greater than the standard scale.

The zoom-out button 75 is a button the user touches in order to switch to the standard mode. Buttons such as the zoom-out button 75 are displayed on the enlarged scale when displayed in the enlarged region 62.

Based on the coordinate value of the reference point in the guidance information, the navigation apparatus 1 determines whether the guidance information is to be displayed in the standard region 61 or the enlarged region 62. And as described above, in the case of display in the standard region 61, the information is displayed on the standard scale, while in the case of display in the enlarged region 62, the enlarged scale is applied. Therefore, the display on the side farther from the user is enlarged so that the user can more easily view the guidance information.

Note that in the example of FIG. 3B, enlargement of the map along with the guidance information in the enlarged region 62 would interfere with the continuity of the map between the standard region 61 and the enlarged region 62. For this reason, the map in the enlarged region 62 is not enlarged. Thus, the navigation device 1 is capable of selective enlargement, rather than uniform enlargement of all guidance information in the enlarged region 62.

Figure 4A:
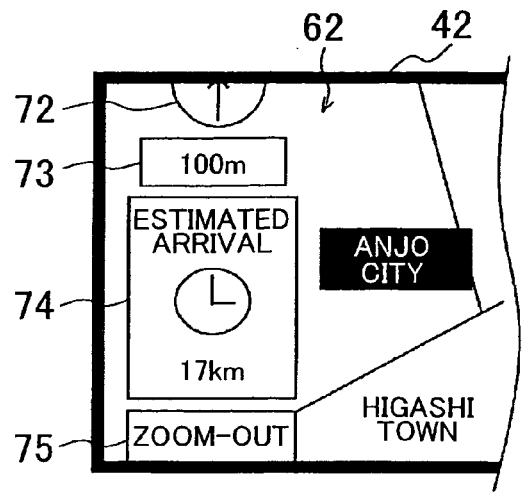
FIGS. 4A-4D illustrate adjustment of a display of the guidance information.

Next, a method for adjusting the display state of the guidance information in the enlarged region 62 will be explained with reference to FIGS. 4A-4D. FIG. 4A shows guidance information displayed on an enlarged scale, without any adjustment in the enlarged region 62. In this example, display positions for an upper part of the orientation marker 72 and a lower part of the zoom-out button 75 are outside of the display on the display unit 42 and therefore not shown.

Thus, for guidance information displayed enlarged in the enlarged region 62, there may be cases where all of the guidance information cannot be displayed. In such cases, the CPU 21, functioning as display control unit 212, can adjust the display state of the guidance information in the following manner.

Figure 4B:
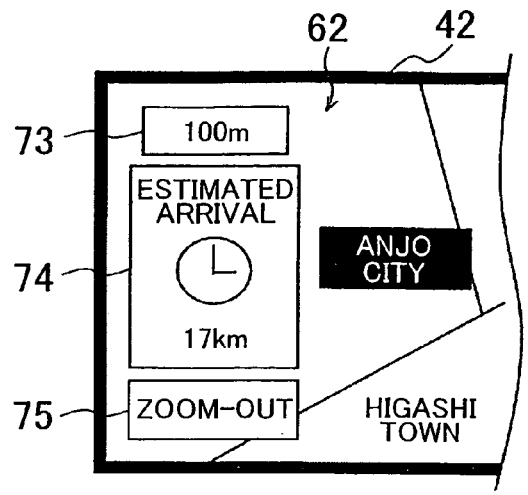

FIG. 4B shows the orientation marker 72 deleted in order to provide display space for the distance marker 73, the estimated arrival marker 74, and the zoom-out button 75. As explained earlier, the guidance information is shown within minimized rectangular regions. When arranging the guidance information on the display screen, the display control unit 212 determines if all or a portion of the rectangular regions are inside the display screen, or if all the rectangular regions are outside the display screen, i.e. not displayed.

Using the foregoing detection function, the display control unit 212 can detect that only a portion of the orientation marker 72 and/or the zoom-out button 75 are displayed as shown in FIG. 4A. The guidance information is prioritized, and in cases where there is non-displayed guidance information or partially-displayed guidance information, the display control unit 212 deletes guidance information with lower priority in order to secure display space.

In this manner, the guidance information is prioritized and if the display positions of guidance information on the side farther from the user are outside of the display screen area of the display device (the display unit 42), then the display control unit 212 deletes guidance information with lower priority in order to display higher priority guidance information.

As shown in FIG. 4B, the priority of the orientation marker 72 is set lower than that of the distance marker 73, the estimated arrival marker 74, and the zoom-out button 75. Therefore, the orientation marker 72 is deleted. If following the deletion of one piece of guidance information, a portion of the guidance information is still not displayed, then another piece of guidance information with the now lowest priority is farther deleted. In cases where a plurality of items guidance information with the same lower priority are displayed, then deletion may be in any type of order, for example, deleting the lowest priority items starting at the top of the screen.

Figure 4C:
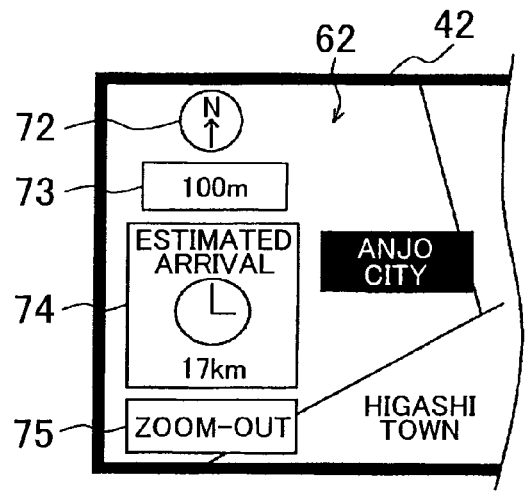

In the above example low priority guidance information is deleted. However, it is also possible provide additional to display space by setting the degree of magnification of low priority guidance information lower than that of other guidance information. In FIG. 4C, since the priority of the orientation marker 72 is set lower than that of other guidance information, the degree of magnification of the orientation marker 72 is set smaller than that of other guidance information. Accordingly, display space can be secured for enlarging and displaying other guidance information with higher priority. Also, the vertical-direction degree of magnification of the estimated time of arrival marker 74 is set smaller than the horizontal-direction degree of magnification, to farther conserve display space.

In the above manner, the guidance information is prioritized and if the rectangular display of guidance information on the side farther from the user is off of the display screen (the display unit 42), display control unit 212 then sets the degree of magnification of the guidance information with low priority lower than the magnification of the higher priority guidance information. Furthermore, the vertical-direction and horizontal-direction magnifications can be changed in order to modify and display guidance information.

Although not shown, all of the guidance information can be structured such that the magnification thereof is set in a range for display in the enlarged region 62. If the magnification is set in a range enabling the display of all the guidance information, then display the guidance information at the maximum magnification which allows the display of all the guidance information is adopted for use. In this manner, if the display areas, e.g. rectangles of guidance information, on the side farther from the user are off (or partially off) the display screen of the display unit 42, then the display control unit 212 can also be configured so as to reduce the guidance information to a degree of magnification that allows display of all of the guidance information on the display screen.

Figure 4D:
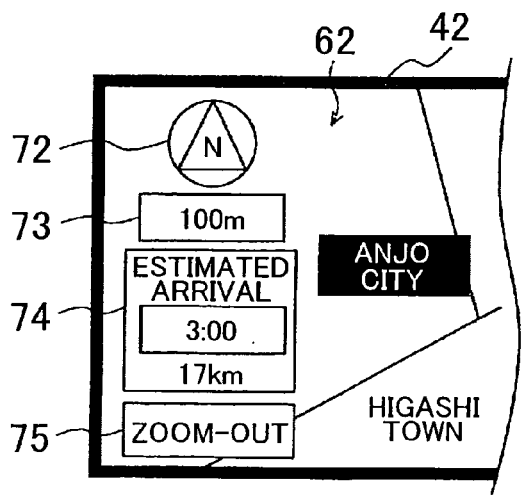

As shown in FIG. 4D, it is also possible to obtain more display space by changing the display state of the guidance information so as to facilitate viewing even with a low magnification. In this case, the navigation device 1 stores a database that records combinations of guidance information and display states for each degree of magnification in the information storage unit 50. After setting the degree of magnification for the various items of guidance information, the display control unit 212 then reads out the display state corresponding to the set magnification and displays the guidance information on the display unit 42. Setting of the magnification can be performed, for example, by prioritizing the guidance information and apportioning larger magnifications to higher priority guidance information so that all the guidance information is displayed with the area of the screen.

For example, the orientation marker 72 FIG. 4D, which is in the form of a triangle and the letter N which indicates north, account for a large portion of the display of the guidance information. Since the north direction can be easily recognized even from afar without magnification, it need not be enlarged, thereby conserving display space while also providing recognition from afar.

With regard to the estimated arrival marker 74, by changing the display of the estimated arrival time from an analog clock display to a digital display it can be more easily viewed from afar without increasing its magnification. Thus, an easy-to-see display can be provided by various combinations of display states and magnifications. Thus, the display control unit 212 can set the magnifications independently for various items of guidance information display unit 42, and can also select a display state for those various items in accordance with the set magnification.

Figure 5A:
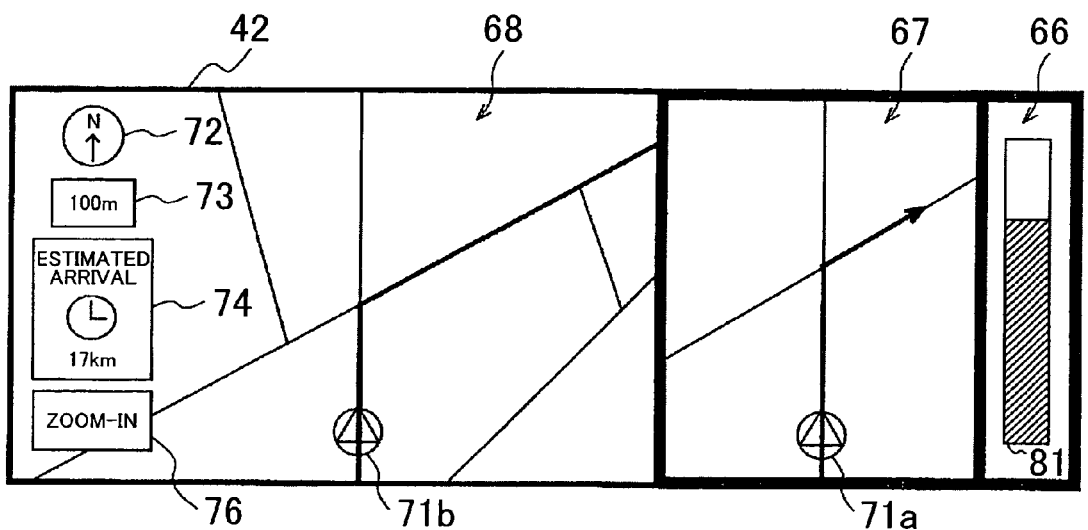
FIGS. 5A and 5B illustrate modifications of the display.

In the example of FIG. 5A, the screen shown on the display unit 42 is formed with three regions, a remaining distance display region 66, a map local detail display region 67, and a large-area map display region 68. Note that the large-area map display region 68 is positioned on the side farther from the user. The remaining distance indicator 81 in the remaining distance display region 66 indicates the distance remaining to a point where a change in course occurs, such as at an intersection.

The map detail display region 67 displays the immediate vicinity of the current position of the host vehicle along with a host vehicle marker 71a, for guidance along the route. The large-area map display region 68 displays a larger area surrounding the current position of the host vehicle along with a host vehicle marker 71b, and also displays the orientation marker 72, the distance marker 73, the estimated time of arrival marker 74 the zoom-in button 76, and the like. FIG. 5A shows a display in standard mode wherein the region 68 is not enlarged. If the user touches the zoom-in button 76, then the display control unit 212 displays the display region 68 in an enlarged (magnified) mode.

Figure 5B:
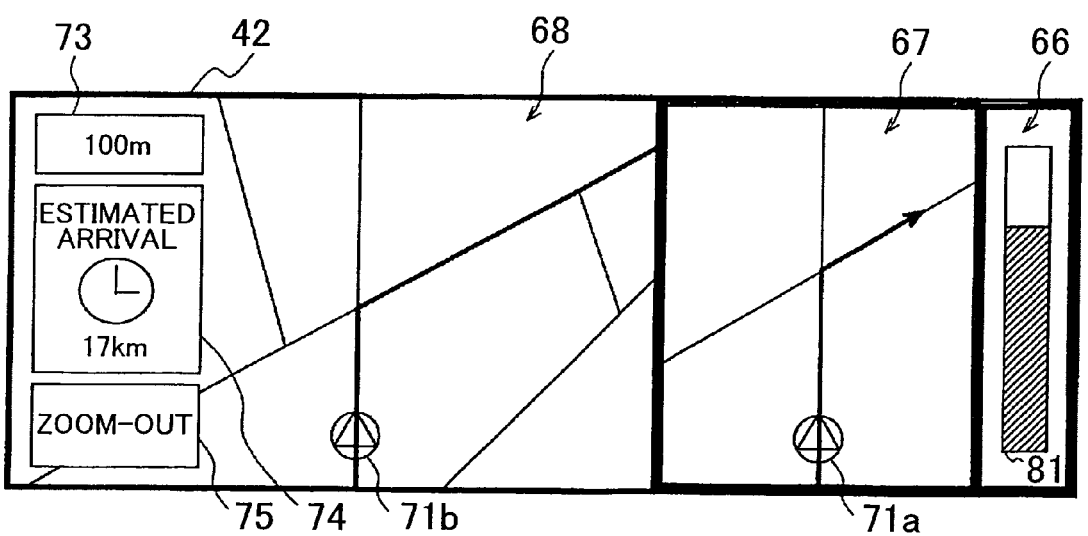

FIG. 5B shows the display region 68 in the enlarged mode. The large-area display region 68 enlarges and displays the distance marker 73, the estimated time of arrival marker 74, and the zoom-in button 75, while the orientation marker 72 is deleted due to its lower priority. The remaining distance display region 66 and the map detail display region 67 are the same as in the standard mode.

In recent years, a so-called duel display has been developed. This involves simultaneously forming two images, a first image and a second image, on the display such that a user viewing the display from a first side (orientation) sees the first image, while from a second side (different angle or orientation) the second image is seen. In this case, the display control unit 212 enlarges and displays guidance information on the second side for one user, and enlarges and displays guidance information on the first side for another user.

Figure 6:
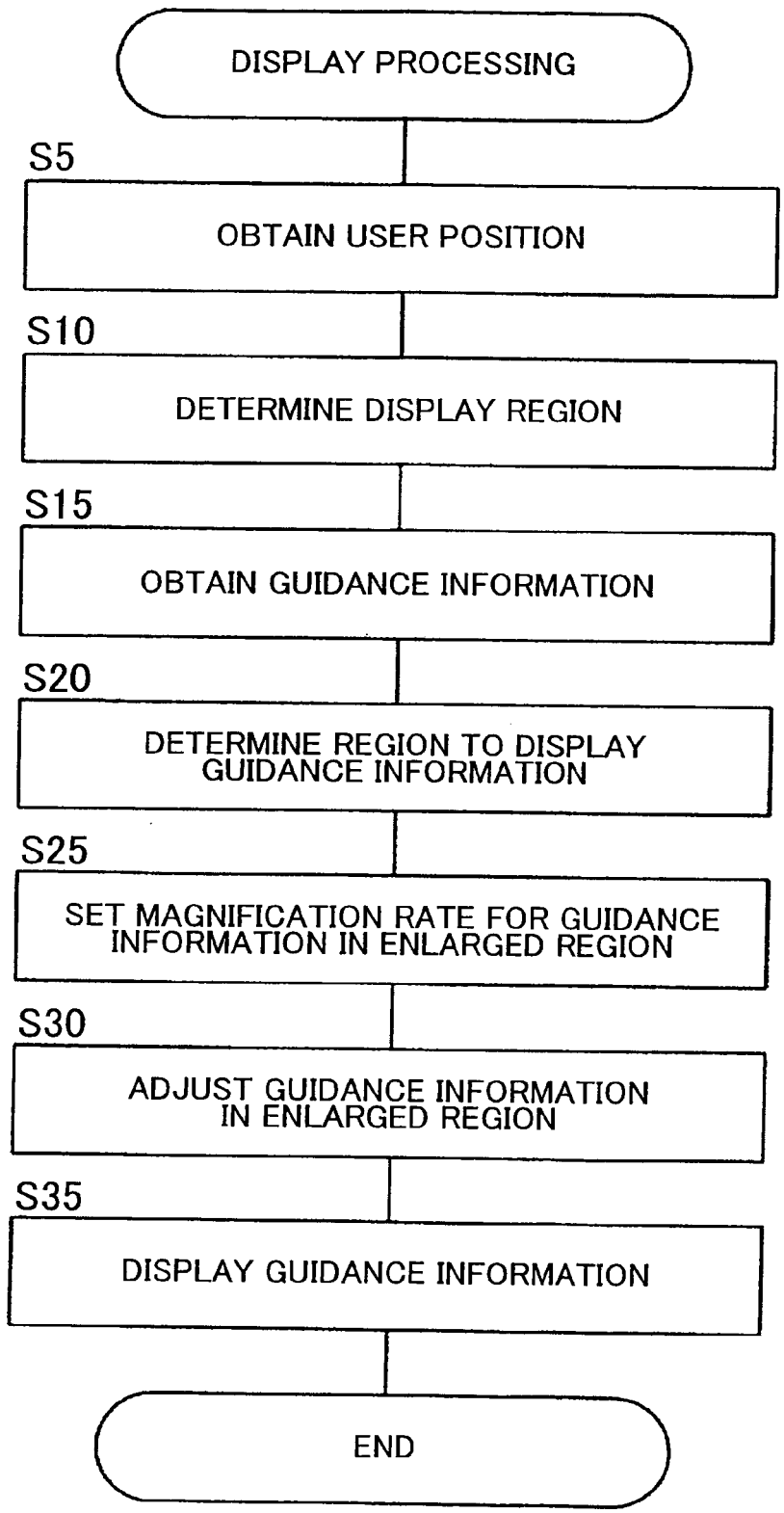
FIG. 6 is a flowchart of an embodiment of the method of the present invention.

Next, a method by which the navigation apparatus 1 displays guidance information will be explained with reference to the flowchart of FIG. 6. Note that the display unit 42 is set to the enlarged mode. First, the navigation apparatus 1 obtains the user position from the user position data in the user position data file 59 (step 5). Thus, the CPU 21 of the navigation device 1 functions as a position acquisition unit 213 to obtain the position of the user.

The display control unit 212 then identifies the sides of the display unit nearer and farther relative to the user based on the obtained user position and sets the standard region 61 and the enlarged region 62 in the display unit 42 accordingly (step 10). In this manner, the display control unit 212 uses the obtained user position to determine the sides of the display unit 42 nearer the user and farther from the user.

The navigation apparatus 1 subsequently obtains the guidance information to be displayed on the display unit 42 from the information storage unit 50 (step 15). Thus, the CPU 21 of the navigation apparatus 1 functions as a guidance information acquisition unit 211 to obtain guidance information. Next, by confirming whether the reference point of the guidance information is located in the standard region 61 or in the enlarged region 62, the display control unit 212 determines the guidance information display region for each item of guidance information (step 20).

Thereafter, the display control unit 212 sets a predetermined degree of magnification for the guidance information to be displayed (step 25). The display control unit 212 determines if a portion of or the whole of any item of guidance information is positioned outside of the display screen (i.e., whether the guidance information runs off the screen). If a portion or the whole of an item is positioned off of the display screen, then the display control unit 212 then changes the display state of one or more items of guidance information in the enlarged region 62, for example by deletion of lower priority guidance information or the like and/or by changing the display position of the guidance information (step 30).

As described above, once the display position and the degree of magnification of the guidance information to be displayed in the enlarged region 62 is set, the display control unit 212 then displays the guidance information at the set display position and magnification within the enlarged region 62, and displays the guidance information in the standard display position and with the standard magnification within the standard region 61 (step 35). Thus, the display control unit 212 sets displays of guidance information on the display unit 42 such that guidance information to be displayed on the side farther from the user is enlarged relative to the guidance information displayed on the side nearer the user. After completing the routine, the navigation apparatus 1 ends the display processing of guidance information.

Summarizing, the above-described embodiment offers the following advantages.

(1) The display control unit 212 enlarges that portion of the display on the side farther from the user, thus improving visibility of that more remote portion of display relative to the user when the user views the display unit 42 at an angle.

(2) In cases where all items of guidance information do not fit in the display screen after enlargement, the display control unit 212 is capable of adjusting the content of the display so that at least the required (most important=highest priority) guidance information is displayed by adjusting the display position and display state of the items guidance information independently.

(3) The display control unit 212 is capable of enlarging and displaying guidance information on the side farther from the user, regardless of the side of the display unit 42 where the user is positioned.

(4) The display control unit 212 is capable of setting the display size of guidance information on the display unit 42 in accordance with the distance from the viewing side (namely, enlarging the display on the farther side).

(5) The navigation apparatus 1 is capable of using a sensor or the like to identify or estimate the user position, and therefore is capable of determining the side from which the user views the display.

(6) In the case of a dual display, the display control unit 212 is capable of enlarging the guidance information in accordance with respective viewing directions.

(7) The display control unit 212 is capable of enlarging and displaying the guidance information in accordance with a magnification allowing all of the guidance information to be completely displayed within the confines of the display screen.

(8) If the enlarged and displayed guidance information runs off the display screen, then the display control unit 212 is capable of making an adjustment by selectively deleting guidance information and/or by changing the display position and/or magnification so that items guidance information determined to be more important (have higher priority) do not run off the screen.

(9) Portions positioned at the farther side of the display relative to the viewer are more easily viewable, and the enlargement of buttons enables their easier operation.

Note that although in the foregoing embodiment the display unit 42 is described as a wide screen display, the display unit 42 is not so limited. The present invention may also be applied to a standard display unit, other than a wide screen. It is also possible, for example, to change the magnification depending on distance from the user, such as by using laser light or the like to measure distance from the display unit 42 to the user, and increasing the magnification for a greater distance from the user.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A navigation apparatus comprising:
a display unit that displays items of guidance information, the items of guidance information being respectively displayed in separate display spaces on a display screen of the display unit;
a guidance information acquisition unit that obtains the guidance information; and
a display control unit that displays the obtained guidance information on the display unit such that at least a portion of the items of guidance information displayed on a far side of the display screen farther from a user is enlarged relative to the items of guidance information displayed on a near side of the display screen nearer the user than the far side; and
wherein the guidance information is prioritized with a predetermined priority, and the display control unit determines if an item of guidance information on the far side is partially or wholly off the display screen of the display unit and, if an item of guidance information is determined to be partially or wholly off the display screen, then the display control unit deletes display of at least one item of guidance information with a predetermined lowest priority from the far side of the display screen, so that all items of the guidance information of higher priority than the at least one item of guidance information appear in whole on the display screen.

2. The navigation apparatus according to claim 1, further comprising a position acquisition unit that determines position of the user relative to the display unit, wherein the display control unit uses the determined user position to determine the near side of the display screen and the far side of the display screen.

3. The navigation apparatus according to claim 2, wherein the position acquisition unit comprises sensors on opposing ends of the display unit.

4. The navigation apparatus according to claim 1, wherein the display control unit changes display state of items of guidance information independently on the display screen.

5. The navigation apparatus according to claim 1, wherein the display screen is a split screen with near side and far side sections showing map displays of different scale.

6. The navigation apparatus according to claim 1, wherein the items of information are displayed superimposed on a map display and wherein, upon deletion of the at least one item of information, the map display is not changed.

7. A navigation apparatus comprising:
a display unit that displays items of guidance information, the items of guidance information being respectively displayed in separate display spaces on a display screen of the display unit;
a guidance information acquisition unit that obtains the guidance information; and
a display control unit that displays the obtained guidance information on the display unit such that at least a portion of the items of guidance information displayed on a far side of the display screen farther from a user is enlarged relative to the items of guidance information displayed on a near side of the display screen nearer the user than the far side; and
wherein the guidance information is prioritized with a predetermined priority, and the display control unit determines if an item of guidance information on the far side is partially or wholly off the display screen of the display unit, and, if an item of guidance information is determined to be partially or wholly off the display screen, then the display control unit reduces the size of the display of at least one item of guidance information on the far side, having a lowest predetermined priority, relative to displays of other items of guidance information with higher priority, so that all items of the guidance information appear in whole on the display screen.

8. The navigation apparatus according to claim 7, further comprising a position acquisition unit that determines position of the user relative to the display unit, wherein the display control unit uses the determined user position to determine the side of the display device nearer the user and the side farther from the user.

9. The navigation apparatus according to claim 8, wherein the position acquisition unit comprises sensors on opposing ends of the display unit.

10. The navigation apparatus according to claim 7, wherein the display screen is a split screen with near side and far side sections showing map displays of different scale.

11. The navigation apparatus according to claim 7, wherein the items of information are displayed superimposed on a map display and wherein, upon reduction in size of the display of the at least one item of information, the map display is not changed.

* * * * *